Jan. 23, 1940. J. L. SPEER 2,188,236
TIRE TOOL
Filed March 31, 1938
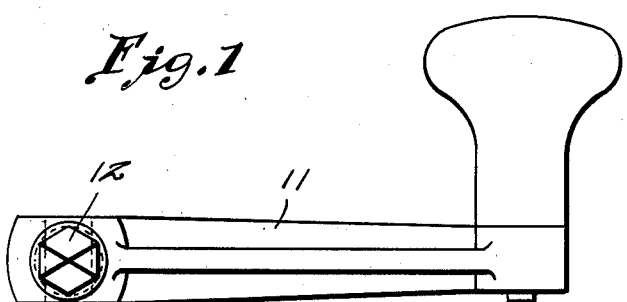
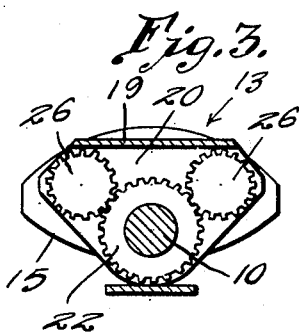
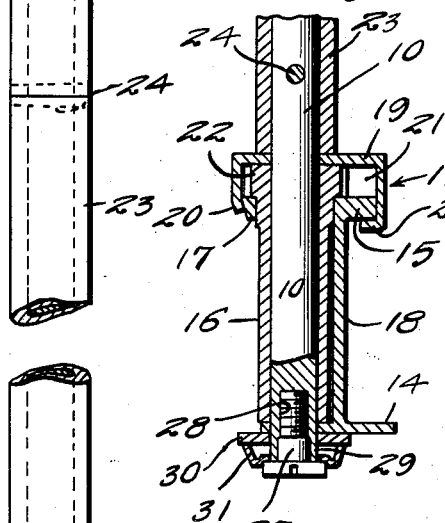
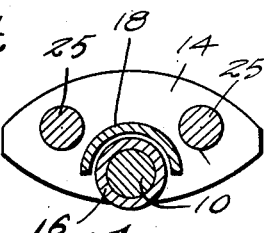
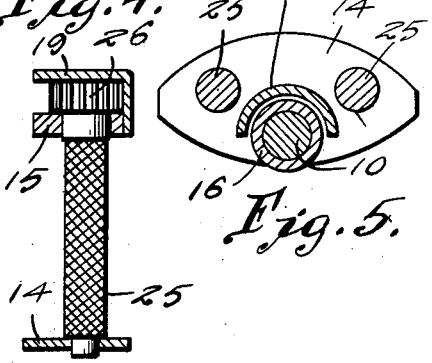
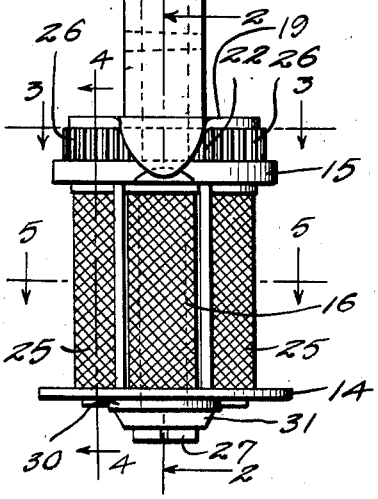
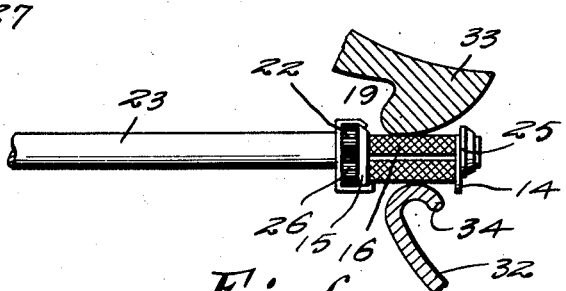
Inventor
J. L. Speer
By L. F. Randolph
Attorney Patented Jan. 23, 1940

2,188,236

UNITED STATES PATENT OFFICE 2,188,236

TIRE TOOL

James L. Speer, Ponca City, Okla.

Application March 31, 1938, Serial No. 199,285

1 Claim. (Cl. 157—6)

This invention relates to a tool for removing pneumatic tires from vehicle wheels.

It is an aim of this invention to provide a tool adapted to be inserted between the bead of a tire and the rim of the wheel, and having rotatable means to engage the tire and wheel and to move relatively thereto to disengage the bead on one side of the tire from the rim.

A further aim of the invention is to provide a device which may be used for mounting a pneumatic tire on the felly of a wheel.

Other objects and advantages of the invention will hereinafter become more fuly apparent from the following description of the drawing which illustrates a preferred form of the invention, and wherein:

Figure 1 is a top plan view of the tool,

Figure 2 is a longitudinal vertical sectional view taken on the line 2—2 of Figure 1, Figure 3 is a cross sectional view taken on the line 3—3 of Figure 1, Figure 4 is a longitudinal vertical sectional view taken on the line 4—4 of Figure 1, Figure 5 is a cross sectional view taken on the line 5—5 of Figure 1, and Figure 6 is a view showing the device applied to a tire and wheel and disposed at the proper angle for removing the bead on one side of the tire from the felly of the wheel.

Referring more particularly to the drawing wherein like reference characters designate like or corresponding parts throughout the different views, 10 designates generally a rotatable shaft having a crank 11 secured to one end thereof by means of the fastening 12.

Loosely mounted on the opposite end of the shaft 10 is a casing designated generally 13, and comprising the end portions 14 and 15, which are oval-shaped as seen in Figures 3 and 5.

A sleeve 16 is keyed to the free end of the shaft 10, as seen in Figure 2, and has one of its ends projecting through an opening 17 in the member 15, and its opposite end abutting against the inner side of the end member 14. A member 18, arcuately shaped in cross section, connects the ends 14 and 15 and is disposed beneath the under part of sleeve 16 and spaced therefrom. A housing 19 is loosely mounted on shaft 10 and is provided with the flange portions 20 which are turned inwardly to engage member 15. The rear wall of the housing 19 is spaced from the member 15 forming the space 21 through which sleeve 16 extends, and in which the annular gear 22, which is keyed to sleeve 16, is adapted to revolve. A sleeve 23, keyed to shaft 10 by means of the pins 24, is mounted on the shaft 10 between housing 19 and the crank 11.

A pair of rollers 25 journaled in the ends 14 and 15 of the casing 13, are disposed one at each side of and beneath the sleeve 16 as seen in Figure 6. Pinions 26 are keyed to corresponding ends of rollers 25, and positioned in space 21 of housing 19 to mesh with the gear 22.

A screw 27 engaging the threaded opening 28 in end 29 of shaft 10 to hold washer 30 and ring 31 against end 14 of casing 13, retains the various parts forming the tool assembled.

From the foregoing it will be seen that sleeve 16 and rollers 25 may be inserted between the felly 32 of a wheel, not shown, and the bead 33 of a pneumatic tire. By swinging the crank end 11 of the tool downwardly the bead 33 will be disengaged from the inturned flange 34 of the felly 32, as seen in Figure 6. Crank 11 may then be rotated to rotate the sleeve 16, which is in engagement with the bead 33 and to revolve the rollers 25 which are in engagement with the flange 34. Rollers 25 being connected by pinions 26 to the gear 22 are revolved in the opposite direction to sleeve 16, so that the tool will be moved around the flange 34 of the felly 32 to raise and release the bead 33. The rollers 25 by being revolved in the opposite direction to the sleeve 16 will cause the tool to move relatively to the felly 32 and to the tire bead 33, since the rollers 25 and the sleeve 16 are each provided with a roughened surface to insure a frictional engagement.

The tool may also be used to apply the tire to the wheel, by inserting the rollers and sleeve between the bead 33 and the flange 34 and by raising the free end of the tool until it is inclined downwardly so that the tool as it moves between the flange and bead will force the bead inwardly and downwardly and release it in a position to engage the flange 34.

Various modifications and changes may obviously be made and are contemplated, and the right is therefore reserved to make such changes as do not depart from the spirit and scope of the invention as hereinafter defined by the claim.

I claim as my invention:

A pneumatic tire demounting tool comprising a shaft having a crank at one end thereof, a casing loosely mounted on the opposite end of said shaft and in which said shaft is rotatably mounted, said casing including spaced end members connected by a bridge, disposed in spaced apart relationship to the adjacent portion of said shaft, one of said end members having a hollow interior portion forming a gear box, a sleeve keyed to said shaft and disposed between the ends of said casing, a gear formed integral with one end of said sleeve and disposed in said gear box, rollers having their ends rotatably mounted in said end members, beneath and at opposite sides of said sleeve, gears formed on corresponding ends of said rollers, disposed within said gear box and in mesh with the sleeve gear whereby the sleeve and rollers will be revolved in opposite directions by said shaft, and means on the last mentioned end of said shaft to removably retain the casing in position thereon.

JAMES L. SPEER.